United States Patent
Shaw et al.

(10) Patent No.: US 6,422,661 B1
(45) Date of Patent: Jul. 23, 2002

(54) HYDRAULIC BRAKE MASTER CYLINDER WITH INTEGRAL PRESSURE TRANSDUCER

(75) Inventors: Schuyler S. Shaw, Dayton; Elaine A. Ruble, Bellbrook, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/804,524

(22) Filed: Mar. 12, 2001

(51) Int. Cl.⁷ .................................................. B60T 8/44
(52) U.S. Cl. ..................... 303/114.1; 60/534; 303/113.4
(58) Field of Search ........................... 303/113.4, 113.3, 303/113.5, 114.1, 115.1, 114.2, 114.3; 60/534

(56) References Cited

U.S. PATENT DOCUMENTS

| | | | |
|---|---|---|---|
| 4,456,309 A | * 6/1984 | Rath | 303/10 |
| 4,726,629 A | * 2/1988 | Resch | 303/92 |
| 5,152,585 A | * 10/1992 | Patient et al. | 303/10 |
| 5,154,495 A | * 10/1992 | Volz | 303/113.3 |
| 5,246,281 A | * 9/1993 | Leppek | 303/114.1 |
| 5,941,608 A | * 8/1999 | Campau et al. | 303/113.4 |
| 6,217,129 B1 | * 4/2001 | Ganzel | 303/11 |
| 6,231,135 B1 | * 5/2001 | Bower et al. | 303/152 |

* cited by examiner

*Primary Examiner*—Paul N. Dickson
*Assistant Examiner*—Devon Kramer
(74) *Attorney, Agent, or Firm*—Scott A. McBain

(57) ABSTRACT

A hydraulic brake master cylinder for a vehicle includes a pressure transducer mounted in the master cylinder primary piston for sensing hydraulic pressure applied to a brake circuit. Transducer signals are transmitted to the exterior of the master cylinder housing through terminals on the transducer which are connected to a plug member mounted on the end of the brake piston actuator rod. The plug member and the rod include passages for extending conductors therethrough for transmitting the transducer signals from the master cylinder.

13 Claims, 2 Drawing Sheets

HYDRAULIC BRAKE MASTER CYLINDER WITH INTEGRAL PRESSURE TRANSDUCER

FIELD OF THE INVENTION

Figure 1:
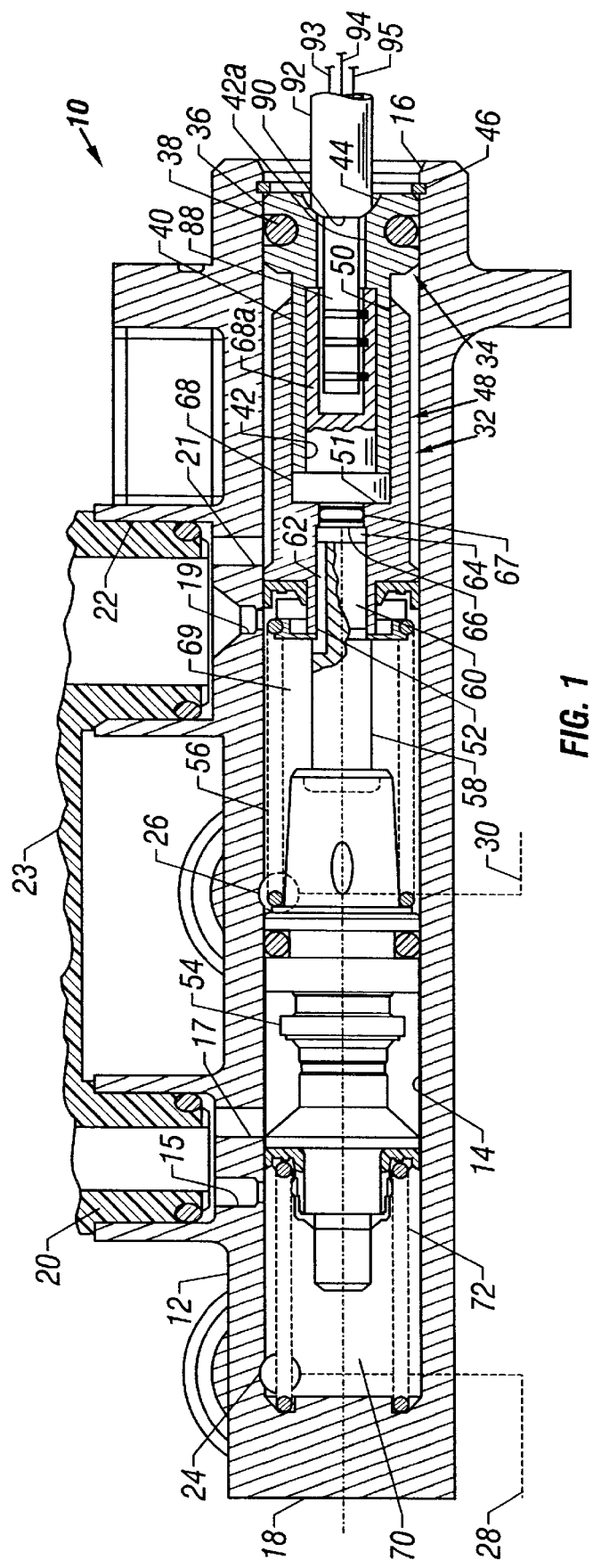

The present invention pertains to a motor vehicle hydraulic brake master cylinder with a pressure transducer integrated with the master cylinder primary actuator piston.

BACKGROUND

Motor vehicle hydraulic brake systems include a so-called master cylinder or actuator which converts mechanical actuation of the brake pedal to hydraulic pressure for the brake hydraulic circuits. In the development of hydraulic brake systems, it is desirable to minimize the number of hydraulic fluid ports and connections between any part of the hydraulic system, including the master cylinder, to minimize problems associated with production and assembly of these parts and potential leakage paths for hydraulic fluid from the system. Moreover, due to space limitations in many motor vehicle engine compartments, it is also desirable to eliminate space required for hydraulic conduits or devices mounted on the exterior of a brake master cylinder housing, such as pressure transducers or other signal generating devices.

However, motor vehicle hydraulic brake systems typically also require a signal generating device or sensor which is operable to transfer a signal related to hydraulic brake pressure for various purposes, including actuation of brake lights, or as a signal input to a braking system controller, as well as possibly other uses of a brake pressure signal in modern automotive vehicle control systems. Accordingly, there has been a strongly felt need to provide for a signal generating or transducer device which may be integrated into the hydraulic brake master cylinder assembly without adding structure external to the master cylinder housing and without providing a point of connection to the cylinder housing which could be a potential leakage path for hydraulic fluid. It is to these ends that the present invention has been developed.

SUMMARY OF THE INVENTION

The present invention provides an improved arrangement of a hydraulic brake master cylinder for a motor vehicle which includes a signal generating pressure transducer which is integrated into the master cylinder housing. In particular, the present invention provides a hydraulic brake master cylinder with a pressure transducer mounted in one of the master cylinder pistons, preferably the primary master cylinder brake actuating piston.

In accordance with another aspect of the present invention, an automotive vehicle hydraulic brake system includes a master cylinder with a pressure transducer mounted in the so-called primary master cylinder piston and which includes a signal conductor path formed by a connector between the transducer and the brake actuator link or rod which may, for example, be the so-called booster output rod from the brake system vacuum force amplifier or booster, or the like.

The invention provides for integration of a pressure transducer operable to sense hydraulic pressure within the master cylinder as applied by the primary master cylinder piston and wherein the pressure signal may be transmitted out of the master cylinder electrically and through the piston actuator or so-called booster actuator output rod. Accordingly, a brake pressure signal may be taken from the master cylinder without adding an external point of connection with the master cylinder fluid chambers or adding a device connected to the exterior of the master cylinder housing.

Those skilled in the art will further appreciate the advantages and superior features of the invention upon reading the detailed description which follows in conjunction with the drawing.

DETAILED DESCRIPTION OF THE DRAWING

Figure 2:
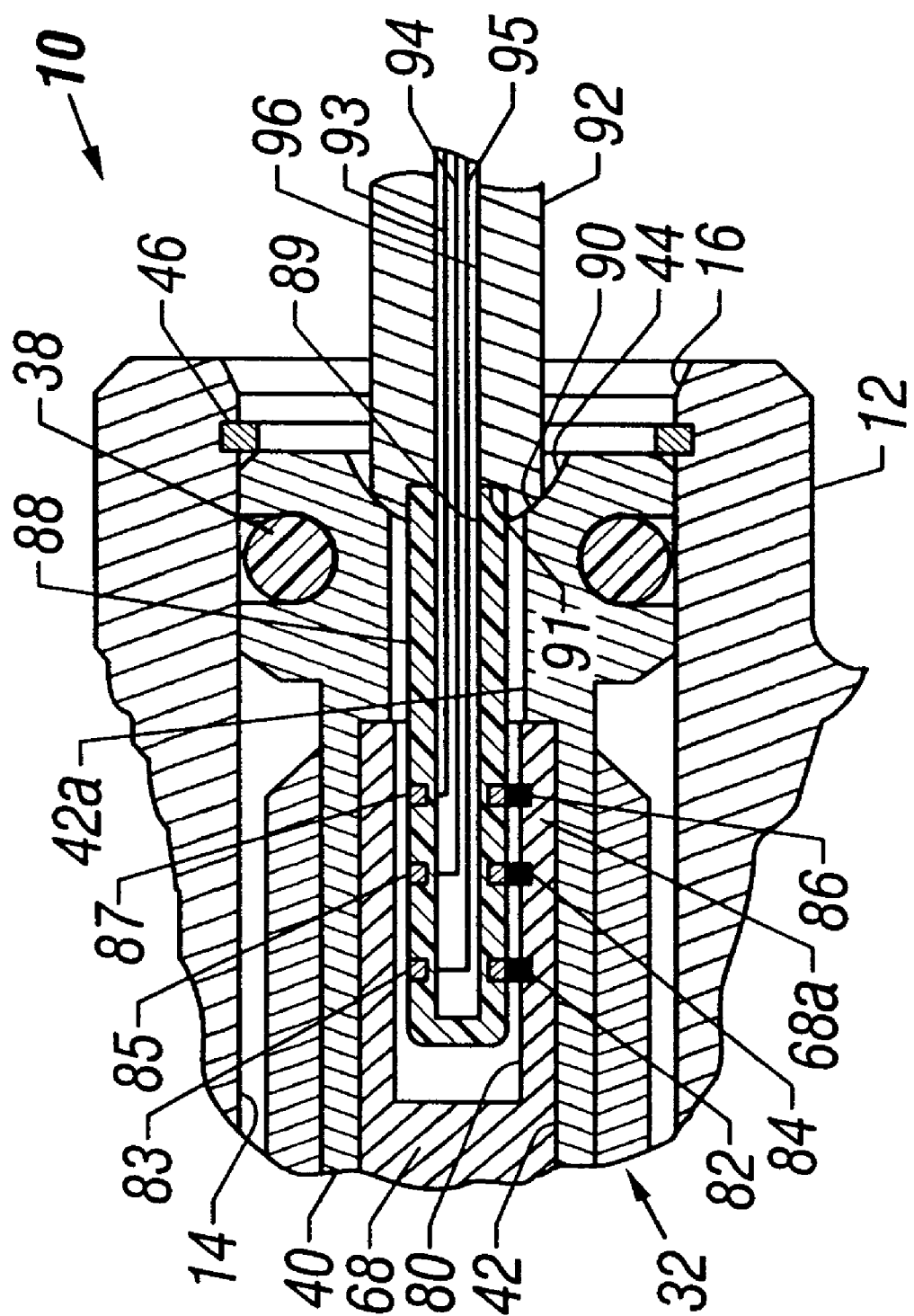

FIG. 1 is longitudinal central section view of a motor vehicle hydraulic brake master cylinder showing the arrangement of an integral pressure transducer in accordance with the present invention; and FIG. 2 is a detail section view of a portion of the master cylinder shown in FIG. 1 on a larger scale.

DETAILED DESCRIPTION OF A PREFERRED EMBODIMENT

In the description which follows, like parts are marked throughout the specification and drawing with the same reference numerals, respectively. The drawing figures may not be to scale in the interest of clarity and conciseness.

Referring to the drawing figures, and primarily FIG. 1, there is illustrated a motor vehicle hydraulic brake master cylinder, generally designated by the numeral 10. The master cylinder 10 comprises an elongated cylinder housing 12 including a longitudinal, central, cylindrical bore 14 extending from an open-end 16 of the cylinder housing to a closed-end defined by a transverse wall 18, FIG. 1. Hydraulic fluid reservoir ports 20 and 22 open to a hydraulic fluid reservoir 23 mounted on the master cylinder 10 in a conventional manner. As further shown in FIG. 1, the master cylinder housing 12 includes respective ports 24 and 26 opening to bore 14 for conducting hydraulic fluid to respective brake circuits 28 and 30, in a conventional manner.

The hydraulic brake master cylinder 10 includes a primary master cylinder piston, generally designated by the numeral 32, slidably disposed in the cylinder bore 14. Piston 32 includes a first cylindrical piston member 34 having a hub 36 of a diameter slightly less than the diameter of the bore 14 and operable to be in fluid-tight sealing engagement with bore 14 by an o-ring seal 38 disposed in a circumferential groove, as shown. Piston member 34 includes a reduced diameter cylindrical stem part 40 extending from the hub 36 and having a cylindrical bore 42 formed therein and of a first diameter. A reduced diameter bore 42a extends from and is coaxial with the bore 42 and opens into a somewhat elliptical-shaped recess 44. Piston 32 is suitably retained in bore 14 by a removable retaining ring 46. Piston 32 includes a second cylindrical piston member 48 which is sleeved over the reduced-diameter stem part 40 of piston member 34 and receives stem part 40 in a cylindrical bore 50. Piston member 48 includes a reduced diameter bore 52 which opens to the opposite end of piston member 48, as shown in FIG. 1.

Master cylinder 10 includes a second piston 54 slidably disposed in bore 14 and operably engageable with piston 32 by way of a coil spring 56 interposed the pistons. An intermediate member 58 also extends between piston 54 and piston 32. Intermediate member 58 includes a reduced diameter cylindrical stem part 60 which extends within bore 52 and includes an elongated slot 62 formed therein. Slot 62 opens to a chamber 64 formed in bore 52 between an endface of reduced diameter stem part 60 and a sensing head 66 of a pressure transducer 68. Pressure transducer 68 is suitably disposed in piston 32 and retained therein between portions of piston members 34 and 48, as illustrated in FIG. 1. Head 66 is in fluid tight sealing engagement with borewall of bore 52 by an o-ring 67, as shown in FIG. 1. In fact, when piston members 34 and 48 are assembled, pressure transducer 68 is firmly clamped between the reduced diameter part 40 of piston member 34 and an end wall 51 delimiting bore 50 of piston member 48. Piston members 34 and 48 may be secured together in one of various suitable arrangements, including, by way of example, a slight interference fluid tight fit between the members.

A fluid-filled pressure chamber 69 is formed within bore 14 between pistons 32 and 54 and is in communication with brake circuit port 28. A second fluid-filled pressure chamber 70 is formed between piston 54 and end wall 18 of cylinder housing 12. A coil return spring 72 is disposed in chamber 70 and engageable with piston 54. Suitable fluid transfer ports 15, 17, 19 and 21 are formed in master cylinder housing 12 for communicating brake fluid between reservoir 23 and the bore 14 in a known manner.

Referring now also to FIG. 2, pressure transducer 68 includes a cylindrical reduced diameter extension part 68a disposed in piston bore 42 and having a suitable bore 80 formed therein. Axially spaced-apart electrical conductor terminals 82, 84 and 86 are disposed in bore 80 and supported by reduced diameter part 68a. Terminals 82, 84 and 86 are in communication with suitable conductor means and circuitry within the transducer 68, not shown, for communicating electrical signals between the transducer and suitable controls means external of the master cylinder 10 and not shown in the drawing.

Referring further to FIG. 2, the terminals 82, 84 and 86 are in electrically-conductive contact with suitable circumferential ring terminals 83, 85 and 87, respectively which are mounted on an elongated cylindrical plug member 88 extending within piston bore 42a and bore 80 of the transducer extension part 68a. Plug 88 is preferably formed of a somewhat elastic material, such as a reinforced plastic and is mounted on the tip 90 of an elongated brake actuator rod 92, see FIGS. 1 and 2. Actuator rod tip 90 is operable to be forcibly engaged with piston 32 at recess 44. The plug 88 is also disposed in a bore 91 in rod 92 and suitably secured to the rod 92 and whereby the plug is operable to maintain electrical contact between the pairs of terminals 82 and 83, 84 and 85, 86 and 87, respectively, even though there may be some misalignment between the rod 92 and the longitudinal centerline of bore 14 of master cylinder housing 12.

As shown in FIG. 2, suitable electrical conductors 93, 94 and 95 extend through an elongated bore 96 in rod 92 and a coaxial bore 89 formed in plug 88. Conductors 93, 94 and 95 are suitably electrically connected to the terminals 87, 85 and 83, respectively. The conductors 93, 94 and 95 may be trained through suitable coupling means, not shown, to the aforementioned controls or other circuitry utilizing the brake pressure signal sensed by the transducer 68.

Accordingly, those skilled in the art will appreciate from the foregoing description, when read in conjunction with the drawing figures, that a unique arrangement of a pressure transducer in a hydraulic brake master cylinder is provided. Accordingly, brake pressure signals may be transmitted to suitable controls for devices requiring the pressure signal by a transducer arrangement which does not require that the transducer be external of the master cylinder housing. In this way also, additional space for a transducer support boss on the housing 12 is avoided, as well as the manufacturing operations required to machine a transducer sensing port and any threads required for connecting the transducer to the master cylinder housing. The additional packaging requirements associated with placing a hydraulic master cylinder in the vehicle engine compartment are also avoided and a potential hydraulic fluid leakage point for the hydraulic brake system is also avoided.

The arrangement of the integral pressure transducer 68 in accordance with the present invention is easy to assemble in that the transducer is formed integral with the master cylinder primary piston 32 and is assembled with assembly of the piston and other conventional components provided in the brake master cylinder assembly. When the master cylinder 10 is connected to a brake booster device or other structure, not shown, for engagement with the brake actuating rod, the modified rod 92 with the terminal connector plug 88 may be easily inserted in the bore 80 provided by the transducer part 68a to form the requisite electrical connection to the transducer. The operation of the pressure transducer 68 in accordance with the invention is believed to be readily understandable to those of skill in the art based on the foregoing description. Conventional engineering materials and commercially available pressure transducers may be used in manufacturing the hydraulic brake master cylinder 10. The transducer 68 may be similar to one of several types commercially available.

Although a preferred embodiment of a hydraulic brake master cylinder and integral pressure transducer arrangement has been disclosed herein, those skilled in the art will appreciate that various substitutions and modifications may be made to the invention described and shown on the accompanying drawing without departing from the scope and spirit of the appended claims.

What is claimed is:

1. A master brake cylinder for a vehicle hydraulic brake system, including a cylinder housing, an elongated bore formed in said housing, a piston disposed for movement in said bore and operably engageable with an actuator rod, a pressure transducer disposed in said bore for sensing hydraulic fluid pressure in said bore applied to a brake circuit connected to said cylinder housing and for generating electrical signals related to said pressure, said transducer being mounted in said piston.

2. The invention set forth in claim 1, wherein:
said piston includes a chamber formed therein in communication with hydraulic fluid in said bore and a passage between said chamber and said bore for communicating hydraulic fluid to said chamber.

3. The invention set forth in claim 1, wherein:
said transducer includes electrical conductor terminals operable to be engaged with electrical conductor terminals formed on a plug member extending within said bore.

4. The invention set forth in claim 3, wherein:
said plug member includes a part connected to said actuator rod.

5. The invention set forth in claim 4, wherein:
said plug member is disposed within a second bore formed in said piston for registration with said terminals of said transducer.

6. The invention set forth in claim 5, wherein:
said plug member is connected to one end of said actuator rod.

7. The invention set forth in claim 6, wherein:
said plug member is formed of a material sufficiently elastically deflectable to allow at least slight misalignment of said actuator rod with respect to said transducer without disconnecting said plug member from electrical contact with said terminals of said transducer.

8. The invention set forth in claim 7, wherein:

said actuator rod and said plug member include passages therein for plural conductors extending from said terminals on said plug member through said passages, respectively.

9. A master brake cylinder for a vehicle hydraulic brake system, including a cylinder housing, an elongated bore formed in said housing, a primary piston disposed for movement in said bore and a secondary piston disposed for movement in said bore, said primary piston being operably engaged with an actuator rod, and a pressure transducer disposed in said primary piston for sensing hydraulic fluid pressure in said bore applied to a brake circuit connected to said cylinder housing and for generating electrical signals related to said pressure, said transducer including electrical conductor terminals operable to be engaged with electrical conductor terminals formed on a plug member extending within said bore.

10. The invention set forth in claim 9, wherein:

said plug member is connected to said actuator rod.

11. The invention set forth in claim 10, wherein:

said plug member is formed of a material sufficiently elastically deflectable to allow at least slight misalignment of said actuator rod with respect to said transducer without disconnecting said plug member from electrical contact with said terminals of said transducer.

12. The invention set forth in claim 11, wherein:

said actuator rod and said plug member include passages therein for plural conductors extending from said terminals on said plug member through said passages, respectively.

13. A master brake cylinder for a vehicle hydraulic brake system, including a cylinder housing, an elongated bore formed in said housing, a piston disposed for movement in said bore and operably engaged with an actuator rod, a pressure transducer disposed in said piston for sensing hydraulic fluid pressure in said bore applied to a brake circuit connected to said cylinder housing and for generating electrical signals related to said pressure, said transducer including electrical conductor terminals operable to be engaged with electrical conductor terminals formed on a plug member extending within said bore and connected to said actuator rod, said plug member being formed of a material sufficiently elastically deflectable to allow at least slight misalignment of said actuator rod with respect to said transducer without disconnecting said plug member from electrical contact with said terminals of said transducer, and said actuator rod and said plug member include passages therein for plural conductors extending from said terminals on said plug member, respectively.

* * * * *